United States Patent [19]

Iwai

[11] Patent Number: 6,115,103
[45] Date of Patent: Sep. 5, 2000

[54] SCANNING-EXPOSURE APPARATUS

[75] Inventor: Katsutoshi Iwai, Hino, Japan

[73] Assignee: Konica Corporation, Tokyo, Japan

[21] Appl. No.: 09/104,614

[22] Filed: Jun. 25, 1998

[30] Foreign Application Priority Data

Jul. 8, 1997 [JP] Japan .................................. 9-182348

[51] Int. Cl.⁷ ............................ G03B 27/52; G03B 27/32
[52] U.S. Cl. ............................................. 355/40; 355/27
[58] Field of Search .................................. 355/27, 28, 40, 355/41, 50, 51; 399/206, 211

[56] References Cited

U.S. PATENT DOCUMENTS

| 5,729,326 | 3/1998 | Yamada ...................................... 355/40 |
| 5,734,460 | 3/1998 | Nakaoka et al. ........................... 355/29 |
| 5,859,689 | 1/1999 | Tanibata ..................................... 355/50 |
| 5,933,214 | 8/1999 | Saitoh et al. ............................... 355/50 |

FOREIGN PATENT DOCUMENTS 3-216636  9/1991  Japan .

*Primary Examiner*—Safet Metjahic
*Assistant Examiner*—Hung Henry Nguyen
*Attorney, Agent, or Firm*—Frishauf, Holtz, Goodman, Langer & Chick, P.C.

[57] ABSTRACT

An exposing apparatus including a conveying device, a scanning device and an exposure device. The conveying device conveys a photographic film reciprocatingly during a first stroke and a second stroke opposite to the first stroke. The scanning device scans an image on the photographic film with light during one of the first stroke and the second stroke, and forms at least one of light reflected from the photographic film and light transmitted through the photographic film into line-shaped image light. And the exposing device exposes a light sensitive material to the line-shaped image light while conveying the light sensitive material relative to the line-shaped image light. The conveying device, moreover, conveys the photographic film at a first conveying speed when the light sensitive material is not exposed to the line-shaped image light, and conveys the photographic film at a second conveying speed when the light sensitive material is exposed to the line-shaped image light, with the first conveying speed being faster than the second conveying speed.

9 Claims, 5 Drawing Sheets

SCANNING-EXPOSURE APPARATUS

BACKGROUND OF THE INVENTION

The present invention relates to a scanning-exposure apparatus which scan-exposes an image on a photographic film onto a photosensitive material, and more specifically to a scanning-exposure apparatus in which a sheet of photographic film is subjected to reciprocating motion employing a scanning/moving means, and during the above-mentioned reciprocating motion, the photographic film is scanned during the forward motion or the backward motion.

Exposure apparatuses in which an image on photographic film (for example, color negative film, reversal film, black-and-white film, etc.) is exposed onto a photosensitive material (for example, photographic paper such as color paper, etc.), include a stationary exposure apparatus in which the whole area of one frame of a photographic film is lighted and the whole area is exposed onto a photosensitive material employing the transmitted light. In this stationary exposure apparatus, in order to focus the image of the photographic film onto the photosensitive material, an optical system is linearly arranged, which results in a dimensional increase of the apparatus.

Accordingly, in order to dimensionally decrease the apparatus, a scanning-exposure apparatus has been developed which is described in Japanese Patent Publication Open to Public Detection No. 3-216636. In such a scanning-exposure apparatus, an image on photographic film is exposed onto a photosensitive material in such a way that a photographic film is placed on a film platen and this film platen is moved, in under synchronization with the photosensitive material, in the sub-scanning direction at a moving speed corresponding to the magnification, employing a pulse motor.

In such a scanning-exposure apparatus, when photographic film is subjected to scanning-exposure, a plurality of frame images are recorded on the photographic film; for example, when one frame is required to be subjected to a plurality of scanning-exposures, the photographic film is subjected to reciprocating motion employing the scanning/moving means. On account of that, as compared with the above-mentioned stationary exposure type, the requirement for the motion which is not associated with exposure results in a decrease in processing speed.

Furthermore, there are various formats (110, 120, 135, IX240 (APS), etc.) for photographic films, and also various formats (E size, L size, postcard, cabinet, 2L, 2L-wide, 8×10 inch size, 10×12 inch size, panorama, hi-vision, etc.) for photosensitive materials. Therefore, when the image on a sheet of photographic film is exposed onto a photosensitive material, magnification requires it to be acceptable for size increases up to ten-odd times. In order to be adapted to such a wide range of magnification, if only the speed of either the photographic film or the photosensitive material is varied (vary the relative speed), the driving system exceeds its operational limits. Therefore, it is required to vary both, and the moving speed of the photographic film is variously changed. In this case, particularly at high magnification, in order to decrease the moving speed, when the photographic film is always moved at such a speed, a decrease in processing speed is caused.

SUMMARY OF THE INVENTION

An object of the present invention herein is to provide a scanning-exposure apparatus for photographic film, which prevents a decrease in processing speed and improves processing performance.

The above-mentioned object can be accomplished by the embodiments mentioned below.

(1) In a scanning-exposure apparatus in which photographic film is subjected to reciprocating motion employing a scanning/moving means; the photographic film is scanned during the forward motion or the backward motion during the above-mentioned reciprocating motion; a projected line image formed through the photographic film or reflection on it and a photosensitive material are relatively moved and an image on the photographic film is scan-exposed onto the photosensitive material, a scanning-exposure apparatus which is characterized in that the above-mentioned scanning/moving means is controlled so that the moving speed of the photographic film becomes faster when moved without scan-exposing onto the photosensitive material than the moving speed when scan-exposing onto the photosensitive material.

(2) A scanning-exposure apparatus described in above paragraph (1), which is characterized in that among the forward motion and the backward motion of a photographic film employing the above-mentioned scanning/moving means, during the forward motion, the image on a photographic film is measured employing transmission light flux or reflection light flux, and during the forward motion, the photographic film is scanned.

(3) A scanning exposure apparatus described in above paragraphs (1) or (2), which is characterized in that the reciprocating motion of a photographic film is carried out between a home position to confirm the image on the photographic film and a start position to initiate the scanning exposure.

(4) A scanning-exposure apparatus described in above paragraphs any one of (1), (2) or (3), which is characterized in that motion which is not accompanied with a scanning-exposure onto the above-mentioned photosensitive material is carried out during the time when the image on the photographic film moves to the home position after completing the scanning-exposure onto the photosensitive material or/and when it moves from the above-mentioned home position to the scanning start position.

In the present invention, the scanning/moving means is a means for conveying the photographic film, the exposing means or, both of the photographic film and the exposing means so that the photographic film is conveyed relative to the exposing means. With this conveying means, the photographic film can be subjected to the scanning exposure.

DETAILED DESCRIPTION OF THE PREFERRED EMBODIMENT

Figure 1:
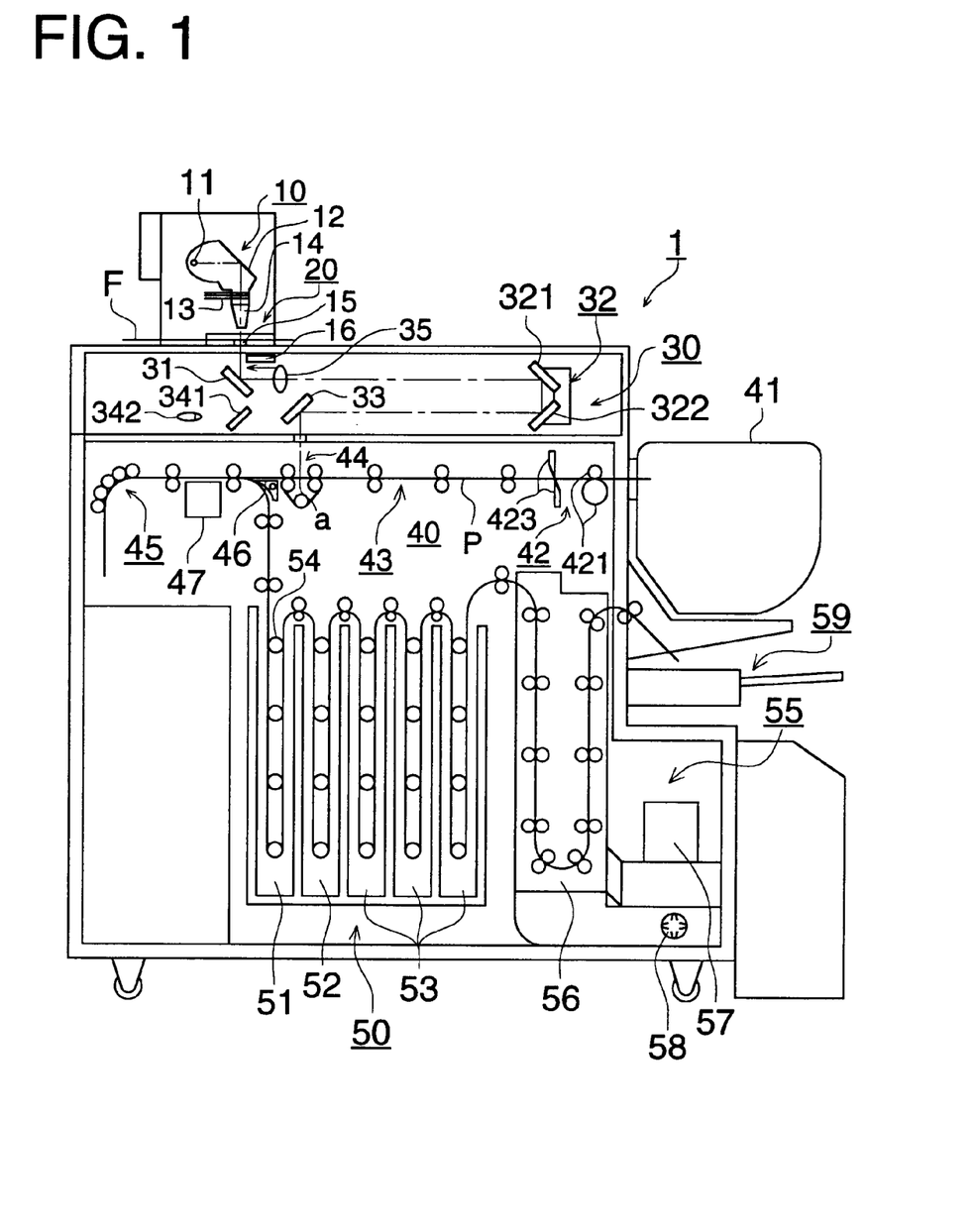
FIG. 1 is a schematic constitutional view of the scanning-exposure-type image-forming apparatus according to the present invention.

Based on the attached drawings, one embodiment of the present invention is described below. FIG. 1 is a schematic constitutional view of the scanning-exposure-type image-forming apparatus according to the present invention.

An image-forming apparatus 1 is one which is equipped with a scanning-exposure device which performs scanning-exposure in such a way that photographic film F, used as an original image, and photosensitive material P are subjected to relative motion by moving both of them, and scanning is carried out by projecting, onto the photosensitive material, a line image formed by light through photographic film F or reflected from the same, and comprises an illuminating means 10 used as an exposing means, a film holding means 20, a drying means 55, a sorter 59, etc.

Firstly, the illuminating means 10 is a means to irradiate light onto photographic film F. This illuminating means 10 is arranged on the upper surface of the main body of the image-forming apparatus 1, and comprises a light source 11, a mirror 12 to reflect light emitted from the light source 11, a yellow filter, a magenta filter, and a cyan filter employed as a light-controlling means 13 which adjusts the light amount in accordance with the density of the photographic film, and a mirror tunnel employed as a scattering means 14 which scatters the light subjected to adjustment for light amount. Further, the adjustment of the light amount by the light-controlling means 13 is carried out by suitably varying the insertion amount of each filter into the optical path, based on photometric values of the photographic film F and correction values, etc. Furthermore, the path of light flux, generated from the light source 11, is altered by the mirror 12; the light amount is adjusted employing the light-controlling means 13; uniformly scattered employing the scattering means 14 and irradiated onto the photographic film F.

The film holding means 20, arranged on the upper surface of the main body of the image-forming apparatus 1, ensures not only the flatness of a frame to be scanned during scanning-exposure, but also moves (in FIG. 1, in the right or left scanning direction) the image frame of the above-mentioned photographic film to be scanned by one frame employing the scanning/moving means 25 used as an conveying means in order to scan one frame among a plurality of frames recorded on the held photographic film. Furthermore, this film holding means 20 has the function to transport frames of the photographic film by releasing it hold on the photographic film in order to vary the frame to be scanned. Accordingly, when a plurality of frame images recorded on the photographic film F require to be formed on photographic materials, the operator needs not reset the photographic film for every frame, and thus work efficiency is improved.

The light flux generated from the illuminating means 10 passes through photographic film F; at the same time, it scans photographic film F which is moving together with the film-holding means 20; it is then led to a second optical means 30 via a slit 15 which is a linear opening extending in the vertical direction across the surface of the paper in FIG. 1 provided in the main body of the image-forming apparatus 1. Further, this film holding means 20 is described in detail below.

The optical means 30 leads the light flux through the photographic film F onto a photographic material under movement described in detail below; focuses an image and projects a line image onto an exposure position, "a". This optical means 30 comprises a first mirror 31, a second mirror 521 provided in a V mirror 32, a third mirror 322, and a fourth mirror 33; the optical path (shown as an alternate long and short dash line in FIG. 1) of the light flux through the photographic film is altered employing these mirrors, and also projects the line image through the photographic film F onto an exposure position "a", employing a focusing means 35.

Furthermore, the mirror 31 is capable of being withdrawn from the optical path by moving at a right angle (FIG. 1, in the right or left direction) against the longitudinal direction of the slit 15, employing a solenoid, motor, etc. not shown in the drawing. When the first mirror is withdrawn from the optical path, the light flux through the photographic film F is led to a photometric element 342 employing a photometric mirror 341 placed right under the slit 15. The photometric element 342 is an element which photometrically measures the amount of light flux for each of B, G, and R through the photographic film F, and is used for the adjustment of the light amount employing the light-controlling means 13. Further, during photometry, each filter employed as the light-controlling means 13 is set at a standard position (for example, full open (no insertion of filters into an optical path)).

Furthermore, a shutter 16 is a member to open or close the slit 15 and is in the open condition at least during photometry employing the photometric element 342, and during exposure onto the photosensitive material P.

Incidentally, in the present embodiment, the light flux from the illuminating means 10 is arranged so as to pass through photographic film F. However, the light flux may also be reflected on photographic film F, so as to obtain an image.

The conveyance means 40 is a means to convey photosensitive material P such as photographic paper, etc. to an exposure position "a", and further to a development means. This conveyance means 40 comprises a paper supply magazine 41, a paper supplying means 42, a standby means 43, an exposure section conveying means 44, a conveyance path switching means 46, a switch-back means 45, etc. A paper-feeding magazine 41 is a magazine to load an unexposed rolled photosensitive material. The paper-feeding means 42 is a means to remove the photosensitive material loaded in the paper-feeding magazine 41 and cuts it to sheets of the photosensitive material P with a predetermined length. This paper-feeding means 42 comprises a pair of paper-feeding rollers 421 which remove the photosensitive material loaded in the paper-feeding magazine 41 and a cutter 423 which cuts the removed photosensitive material P to the predetermined length so as to make sheets of the photosensitive material P.

The standby means 43 comprises a plurality of paired rollers and a means to let a sheet of the photosensitive material P stand by before exposure and the photosensitive material P under cutting. Further, a plurality of the paired rollers of this standby means 43 are constituted so as to enable pressure-contact/release; are released while the photosensitive material P is being exposed and are constituted so as to give no load to the photosensitive material P under exposure.

The exposure section conveying means 44 is a means to convey photosensitive material P under exposure at a predetermined constant speed, and during exposure, it may be preferable that photosensitive material P is only conveyed by this exposure section conveying means 44. This exposure section conveying means is composed of a plurality of rollers and a conveyance belt. Employing the exposure section conveying means 44, photosensitive material P is conveyed in the relatively moving direction (in FIG. 1, right or left direction) in the approximately orthogonal direction against the extending direction of the line image projected onto a exposure position "a", while the line image of the film F formed by scanning, employing the light-emitting means 10, the film-holding means 20, and the optical means 30 is successively exposed.

Further, photosensitive material P conveyed by the exposure section conveying means 44 is accelerated up to the predetermined constant speed until the leading edge of photosensitive material P reaches exposure position "a", and photographic film F and photosensitive material P are brought into synchronization. This synchronization is described in detail below.

The conveyance path switching means 46 is a means to switch the conveyance path of photosensitive material P under exposure to the following switch-back means 45 and the conveyance path of photosensitive material P at the switch-back means 45 to the following development means.

The switch-back means 45 is a means which once accepts exposed photosensitive material P; changes the conveyance direction (changes the leading edge of the conveyance direction), and conveys it to the development means 50. This, when the exposed photosensitive material P is subjected to development processing employing the development means 50, is to prevent damage such as abrasion, caused by the guide member (not shown in FIG. 1) at the U-turn section, by directing the emulsion surface of the photosensitive layer of the photosensitive material P to the interior of each processing tank. Furthermore, when photosensitive material P is conveyed directly to the development means 50 without passing through the switch-back means, jamming is caused due to the difference in conveyance speeds in the development means 50 and unnecessary load is placed on the photosensitive material being exposed. Or when sufficient conveyance length is provided so that no jamming occurs and unnecessary load is not placed on photosensitive material P under exposure, a problem with a dimensional increase of the apparatus is caused.

Further, a rear-surface marking means is provided between the conveyance path switching means 46 and the switch-back means 45. This rear-surface marking means prints the frame number, exposure conditions, etc. onto the back surface (surface opposite the emulsion surface) of photosensitive material P, while photosensitive material P loaded into switch-back means 45 is guided and conveyed into the path to the development means 50 upon being switched by the conveyance path switching means 45.

As mentioned above, in the present embodiment, exposure position "a" is fixed; the line image on photographic film F, which is projected onto exposure position "a" is successively exposed onto photosensitive material P, conveyed by the exposure section conveying means 44, and the image on photographic film F is scan-exposed onto photosensitive material P.

The development means 50 is a means to photographically process the exposed photosensitive material P. This development means 50 comprises a color development tank 51, which carries out color development of the photosensitive layer of photosensitive material P; a bleach-fixing tank 52, which bleaches and fixes the photosensitive layer subjected to color development; a stabilizing tank 53, which stabilizes the photosensitive layer; and a plurality of rollers (partly shown in FIG. 1) which successively convey photosensitive material P into each of tanks 51, 52, and 53.

A drying means 55 is a means which dries processed photosensitive material P. The processed photosensitive material is conveyed through the interior of a drying rack 56, as a drying section, employing a plurality of rollers (not shown) working as a conveyance means for the photosensitive material P, while air, heated by a heater serving as a heating means, is sent into the interior of the drying rack 56 employing a drying fan 56 as an air forcing means.

A sorter 59 is a means to sort, according to each order, the dried photosensitive material P which is ejected into the exterior of the image-forming apparatus 1.

The operation is explained by which images are formed employing this image-forming apparatus 1.

Roll-shaped photosensitive material P loaded in the paper-feeding magazine 41 is ejected from the paper-feeding magazine 41 employing paired paper-feeding rollers 421; is conveyed by paired rollers of the standby means 43, and is cut to predetermined length employing the cutter 423 to form sheets of photosensitive material P. The leading edge of sheets of photosensitive material P is caused to pause at the position of the standby means 43, where it is being nipped at the entrance (upstream in the conveyance direction) of the exposure section conveying means 44, until the preparation of the film holding means 20 for movement for scanning is completed (as detailed below, the film holding means 20 stops at the start position). When the preparation of the film holding means 20 is completed, the standing-by photosensitive material P is conveyed at a predetermined speed by the exposure section conveying means 44.

On the other hand, when the preparation of the film holding means 20 is completed, it is brought into synchronization with photosensitive material P conveyed by the exposure section conveying means 44 and photographic film F starts to move in the scanning direction (to the right in FIG. 1), and light emitted from the illuminating means 10 illuminates the photographic film supported by the film holding means 20; the whole area of one frame of photographic film F is scanned by moving photographic film F in the scanning direction (right direction in FIG. 1) together with the film holding means 20. The optical path of light flux passing through photographic film F is changed by the first mirror 31, second mirror 321, third mirror 322, and fourth mirror 33, while a line image is projected at exposure position "a", employing the focusing means 35.

The line image projected onto exposure position "a" through photographic film F is exposed onto photosensitive material P during conveyance employing the exposure section conveying means 44. At this time, the means to convey the photosensitive material P. except the exposure section conveying means 44, are subjected to, for example, release of pressure contact of photosensitive material P with the paired rollers in the standby means 44, so as not to render driving force to photosensitive material P. The image of photographic film F is exposed onto a whole area of photosensitive material P, while being synchronized with scanning of photographic film F employing the exposure section conveying means 44.

The leading edge of photosensitive material P under exposure is conveyed to the switch-back means employing the conveyance path switching means 46. When exposure onto photosensitive material P is completed, the direction conveying for photosensitive material P is reversed by the switch-back means and it is led to the development means 50 employing the conveyance path switching means 46. At this time, the frame number, exposure conditions, etc. are printed onto the back surface of photosensitive material P employing the rear-surface marking means 47.

Photosensitive material P conveyed by the development means 50 is successively conveyed to the color development tank 51, bleach-fixing tank 52, and stabilizing tank 53, while the emulsion surface of photosensitive material P is directed to the inside, and is subjected to photographic processing. Photosensitive material P, after completion of photographic processing, is dried, while being conveyed through the interior of the drying rack 56 employing paired rollers and is ejected to the exterior of the apparatus.

Furthermore, when scanning-exposure is completed, the film holding means 20 carries out a frame transport to the next frame and in the same manner as described above, scanning-exposure, photographic processing, etc., and ejection from the apparatus to the exterior are carried out. Thereafter, the ejected photosensitive material P is sorted by the sorter 59 depending on each order.

Further, there are various formats (110, 120, 135, IX240 (APS), etc.) for photographic film and also various formats (E size, L size, postcard, cabinet, 2L, 2L-wide, 8 ×10 inch size, 10×12 inch size, panorama, hi-vision, etc.) for photosensitive materials. Therefore, the original image on a photographic film requires to be exposed onto a photosensitive material employing various projection magnifications. Thus, in the present embodiment, in order to vary the projection magnification, it is constituted in such a way that magnification in the magnifying direction of the line image is varied by changing the optical length in which the focusing means 35 is centered, while moving the V mirror 32 (or alternately a zoom lens is employed in the focusing means and zooming magnification is carried out employing the zoom lens). Furthermore, it is constituted in such a way that magnification in the direction orthogonal to the magnifying direction of the line image is varied by changing the relative moving speed of the photographic film F with the photosensitive material P.

Figure 2:
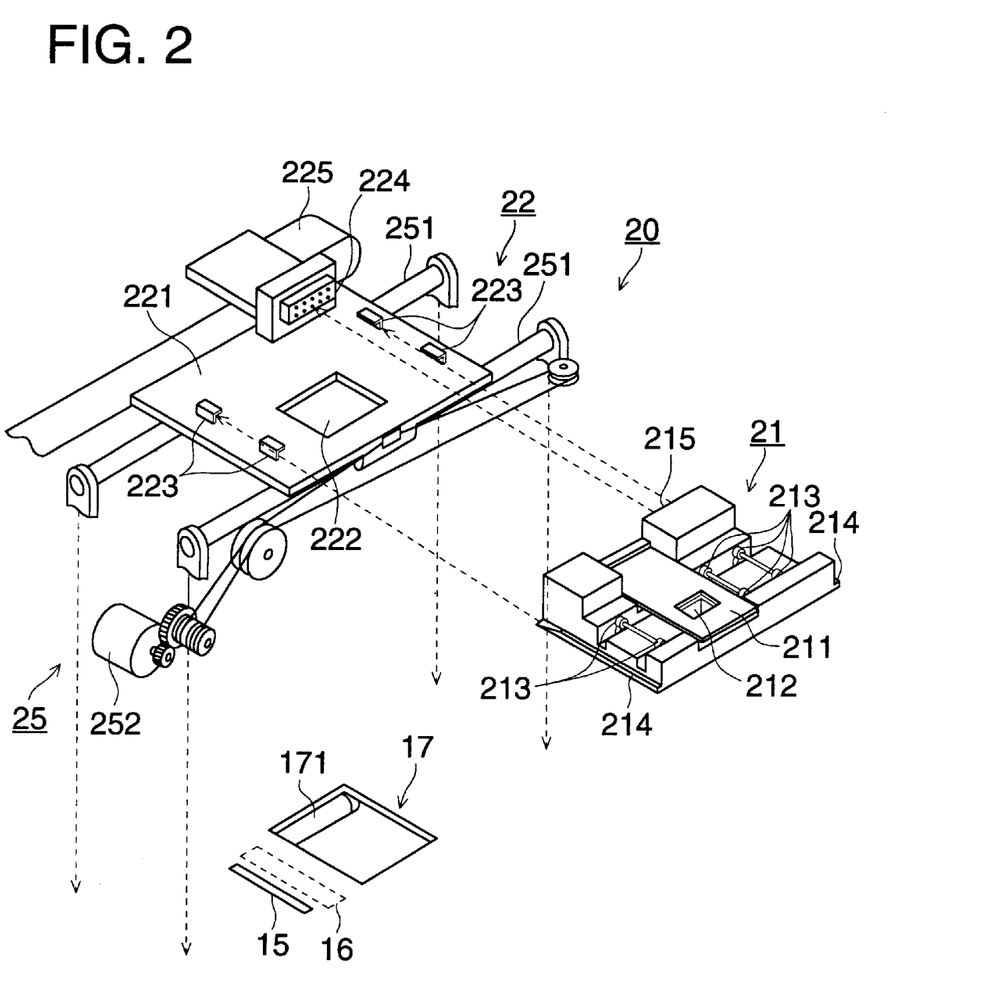
FIG. 2 is a perspective view of a film holding means.

The film holding 20 is explained below, referring to FIG. 2 of the perspective view. Further, FIG. 2 shows, in addition to the film holding means 20, the scanning/moving means 25 which moves the film holding means 20 (in other words, the photographic film is moved for scanning), slit 15, shutter 16, and viewer 17 not shown in FIG. 1.

As previously mentioned, the film holding means 20 holds, at least during scanning-exposure, frames of photographic film F to be scanned while keeping the frames flat, and in order to scan one image of a plurality of frames of photographic film F subjected to recording, the to-be-scanned image on one frame of the above-mentioned photographic film is moved by one frame to the right or left in FIG. 1, employing the scanning/moving means 25. Furthermore, in order to vary a frame to be scanned, this film holding means 20 comprises the function of conveying frames of the photographic film F upon releasing holding of the photographic film F.

The film holding means comprises the feeder 21, which is a flattening means for holding the flatness of the photographic film F in which curling is likely and a frame transport means which transports frames, and the carriage 22 which holds the feeder 21 and moves in the scanning direction together with photographic film F and the feeder 21. The apparatus is constituted in such a way that by moving these feeder 21 and carriage 22 (that is, film holding means 20) employing the scanning/moving means 25, photographic film F is moved.

As mentioned above, in the present embodiment, the film holding means 20 is divided into the feeder 21 and the carriage 22 so that the feeder 21 can be replaced for each format of photographic film F, such as 110, 120, 135, IX240, etc. Further, when photographic film F is directly moved for scanning, it is difficult to maintain the flatness of the film which readily curls and it is impossible to carry out suitable image exposure onto photosensitive material P. However, as shown in the embodiment of the present invention, by moving the carriage 22 (the feeder 21 held by the carriage 22 and further, the photographic film F held by the feeder 21) suitable scanning-exposure can be carried out, while maintaining the required flatness.

Further, in the present embodiment, the flatness maintaining means and the frame transport means are integrated as the feeder 21, and this feeder 21 is detachable from the carriage 22 (which is also the main body of the image-forming apparatus). Without being limited to this, the flatness maintaining means and the frame transport means may be individually detachably attached to the carriage 22. Furthermore, the feeder 21 and the carriage 22 may be integrated.

The feeder 21 comprises a pressure contact plate 211, forced from the upper direction, which is the direction to release the plate employing elastic force resulted by an elastic means such as a spring (not shown), and functions as the film holding means. In this pressure contact plate 211, an opening 212 corresponding to various formats of photographic film F is provided, and this pressure contact plate 211 is in pressure contact with photographic film F driven against elastic force employing a driving member such as a solenoid (not shown), and during scanning of photographic film F, keeps the photographic film F flat as well as holding the photographic film. Furthermore, when the drive to the driving member is released, the pressure contact plate 211 terminates the pressure contact via elastic force against photographic film F.

Furthermore, the feeder 21 is provided with a plurality of paired rollers 213, and photographic film F is nipped between these paired rolls. These paired rollers 213 function as a position-matching means which matches the position of the frames of photographic film F, a frame transport means which transports the photographic film by frame, and insert-ejection means which inserts the photographic film F into the feeder 21 and ejects it therefrom, and are driven by the motor (not shown) arranged in the feeder 21 in order to match the position of the photographic film F, transport the frame of the photographic film F and insert the photographic film F into the feeder 21 and eject it therefrom when pressure contact against the photographic film F by the pressure contact plate 211 is released. Furthermore, in the feeder 21, are provided the connected member 223 and the connecting member 214 of a carriage base body 221 mentioned below. Further, these solenoid motors are driven and controlled upon receiving a power source and control signals from a connector 215 provided at the back of the feeder 21.

The carriage 22 supports the feeder 21, while comprising the carriage base body 221 which can be moved in the scanning direction (direction orthogonal to the longitudinal direction of the slit 15). In the carriage base body 221, the opening 222 is provided in the position corresponding to the opening 212 of the feeder 21. This opening 222 provides an opening larger than the largest format which the image-forming apparatus 1 can handle so as to correspond to a plurality of formats of photographic film F. Furthermore, in the carriage base body 221, are provided the connected member 223 connected to the connecting part member of the feeder 21 and the connector 224 connected to the connector 215 of the feeder 21. The connected part 223 of this carriage base body 221 works as a holding means holding the feeder 21, and the feeder 21 is held by the carriage base body 221 by connecting to the connecting member 214 of the feeder 21.

The scanning/moving means 25 is a means to reciprocate the carriage 22 in the scanning direction (in other words to reciprocate the photographic film F), and comprises a pair of guides 251 to guide the movement of the carriage 22, driving motor 252 to move the carriage 22, etc. The driving motor 252 drives a wire (not shown) hung on a pulley (not shown) via a gear (not shown), and because this wire is connected to the carriage base body 221, the carriage 22 can be reciprocated in the scanning direction by normal or reversed rotation of the driving motor 252. At that time, the carriage 22 is forced in straight movement while being slid with the guide 251.

Further, an flexible base plate 225 is connected to the image-forming apparatus 1 and the turned connected end is connected to the carriage base body 221. Power source and control signals are provided to the solenoid of the feeder 21 and a motor via this flexible base plate 225 and connectors 224 and 215.

Furthermore, under the opening 222 within the movement range (reciprocation range in the scanning direction, in other words, on a forward stroke and a backward stroke) of the carriage 22, the slit 15 and viewer 17 are provided in the image-forming apparatus. In addition, under this slit 15, is provided a shutter 16 as a light-shielding means to open or close the slit 15. This shutter 16 is driven by a solenoid, etc. as a driving means (not shown). Further, when the shutter is in the open position, light can pass into the optical means 30 of the following step through this slit 15. When the shutter 16 is in the closed position, light can not pass through the optical means 30. Furthermore, the viewer 17 is a surface emitting means to allow direct visual observation of the image on photographic film F, and light emitted from a light emitting means 171 such as a fluorescent lamp, etc. is converted to a surface light source employing a light guiding plate or reflection plate. Thus, it enables the operator's direct observation in such way that light flux from this surface light source illuminates photographic film F supported by the feeder 21.

Figure 3A:
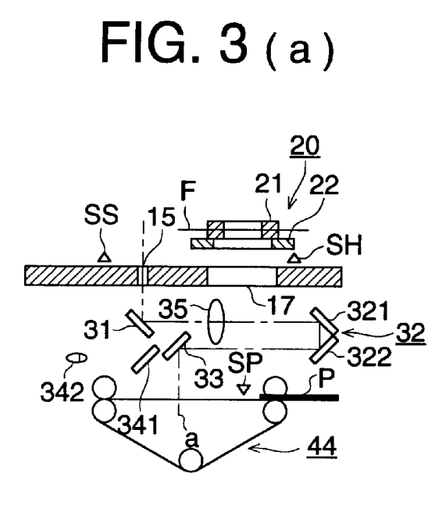
FIGS. 3(a) to 3(f) are schematic views showing the motion of a film-holding means and an exposure section conveying means.
Figure 3B:
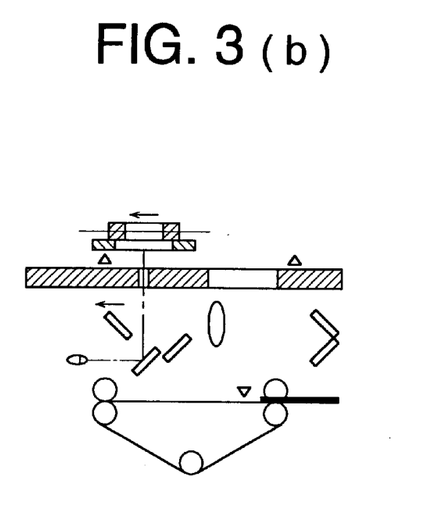
Figure 3C:
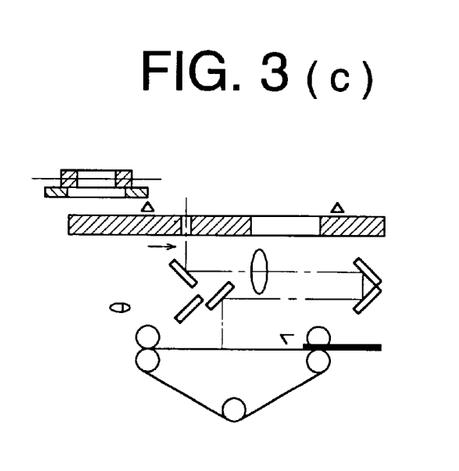
Figure 3D:
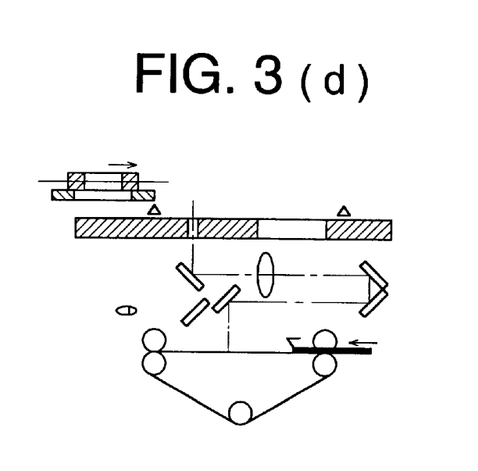
Figure 3E:
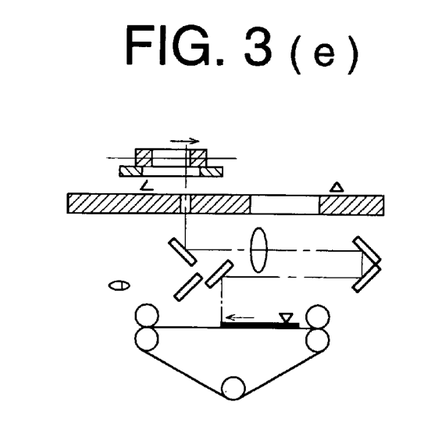
Figure 3F:
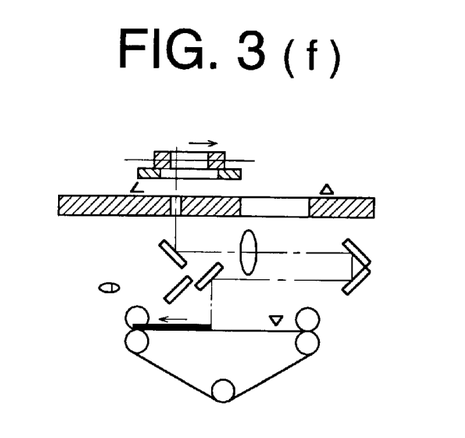
Figure 4:
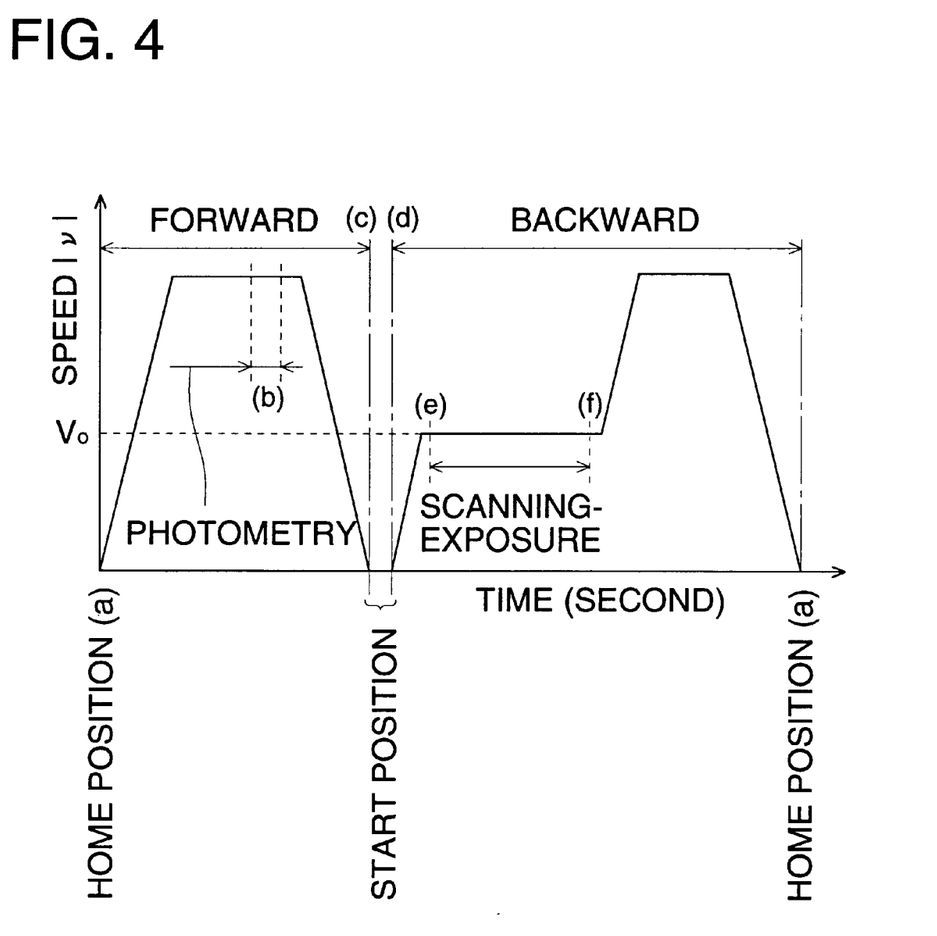
FIG. 4 is a schematic view of the moving speed of the carriage.

The movement of the film holding means 20 is explained below with reference to FIG. 3, which schematically shows the operation of the film holding means 20 (feeder 21 and carriage 22) in synchronization with photosensitive material P and the exposure section conveying means 44, which FIG. 4 schematically shows the speed of the carriage 22. Further, what is explained herein is the operation of the film holding means 20, when scanning-exposure is carried out upon inputting a correction value for every frame of the photographic film. Furthermore, (a) to (f) in FIG. 4 correspond to (a) to (f) in FIG. 3, respectively.

In FIG. 3, home position sensor SH as a first sensing means which detects that the film holding means 20 is provided above the viewer 17 (the opening 222 of the carriage 22 located above the viewer 17, that is, a home position which is the position wherein the image of photographic film F held by the carriage 22 via the feeder 21 can be visually observed, and because in the present embodiment, the position is the same as the home position of the film transport means 20, it is termed the home position below.). Furthermore, in order to determine the position (the start position) to start the movement for scanning the home position against the slit 15. Furthermore, in order to detect the leading edge of photosensitive material P conveyed by the exposure section conveying means 44 for scanning-exposure, a photosensitive material sensor SP employed as a photosensitive material detecting means is provided in the upstream side in the conveying direction of photosensitive material P against the exposure position "a". In addition, in the present embodiment, home the position sensor SH and the photosensitive material sensor SP are fixed at predetermined positions, while start sensor SS is provided so that the distance to the slit 15 can be varied in accordance with projection magnification employing a driving means (not shown). Furthermore, in the present embodiment, when the photosensitive material sensor SP detects photosensitive material P conveyed by the exposure section conveying means 44, it is constituted in such a way that the signal becomes a trigger to start the movement of the carriage 22.

When the image of photographic film F is exposed at a predetermined magnification of $m_0$ onto photosensitive material P conveyed at a speed of $P_0$, moving speed $v_0$ of the carriage 22 during scanning exposure is $P_0/m_0$. A start sensor SS is arranged at a position apart from the slit 15 at a distance necessary to bring the image on photographic film F into synchronization with photosensitive material P. Further, the speed in the present embodiment refers to the speed at a constant rate. Furthermore, in the present embodiment, in order to carry out good scanning-exposure, during exposure of the image on photographic film F onto photosensitive material P (during scanning-exposure), the moving speed is kept constant (constant speed state).

At first, the first frame (the image on photographic film F corresponding to the opening 212 of the feeder 21 in FIG. 2) of photographic film F is set at the feeder 21, and the carriage 22 stops (FIG. 3(a)) under the state in which the opening 212 of the feeder 21 stays over the viewer 17 (at the home position). At the time, the carriage 22 is detected by the home position sensor SH. Here, light emitted from the viewer 17 passes through the image of the first frame of photographic film F, and the operator confirms the image of the first frame. When the position of the first frame is matched, judgment is simultaneously carried out with the use of the transmitted image and correction values are input when correction for color failure, etc. is required. On the other hand, the photosensitive material P is nipped by the exposure section conveying means 44 and is in the standby state.

When judgment or input is completed, the feeder 21 moves (forward movement) the carriage 22 in the left direction (the forward stroke on the forward path) in FIG. 2, under the state in which the feeder 21 holds the photographic film F (the state in which photographic film F is in pressure contact employing the pressure contact plate 211)(FIG. 3(b)). During this movement, the opening 212 passes over the slit 15 and the amount of light flux transmitting the image of the first frame, which is emitted from the light-emitting means 10, is measured by a photometric element 342. Further, prior to this, the first mirror 31 is withdrawn from the light path and the light flux passing through the slit 15 is arranged so as to be incident to the photometric element 342.

As shown in FIG. 4, the movement of the carriage 22 (photographic film F) during this forward movement is controlled by the scanning/moving means 25 so that the moving speed is greater than the moving speed $v_0$ during scanning-exposure. Further, during this forward movement, photometry is carried out as mentioned above. However, this photometry is not for photographing the image, and light amount transmitted through the image of the photographic film F is measured for each of BGR. Thus, moving speed faster than the moving speed $v_0$ causes no problem. However, during this photometry, in order to carry out accurate photometry, the moving speed of the carriage 22 is preferably in a constant speed.

The carriage 22 is detected by the start sensor SS. Namely, when the carriage 22 reaches the start position from which the movement for scanning-exposure starts, the carriage stops the movement (FIG. 3(c)). Further, until this stage, the start sensor SS has finished the movement of the predetermined distance (variable in accordance with magnification) from the slit necessary for bringing the image onto photographic film F into synchronization with photosensitive material P. Furthermore, when photometry is completed, the first mirror returns to the optical path; the light-controlling means 13 is also controlled according to input correction values and photometrically measured values and thus, the amount of light is adjusted. In this stage, the preparation for the movement of the film-holding means 20 has been completed.

When the carriage base body 221 reaches the start position, the exposure section conveying means 44 starts conveying the standing-by photosensitive material P at a predetermined speed of $P_0$. Further, when the image on photographic film F is intended to bring into synchronization with photosensitive material P, photosensitive material P may start the conveyance before reaching the start position. When the photosensitive material sensor SP detects the leading edge of the photosensitive material P conveyed by the exposure section conveying means 44, the carriage 22 is immediately moved in the right in FIG. 3 at a predetermined speed of $v_0$ for scanning the first frame of photographic film F which is brought into synchronization with photosensitive material P, employing the exposure section conveying means 44 (FIG. 3(d)).

After a line image, corresponding to the image transmitting the image of photographic film F moving together with the carriage 22, is projected onto the exposure position "a", photosensitive material P passes over the exposure position "a" (FIG. 3(e)). Namely, after the image of photographic film F is projected, exposure is carried out onto photosensitive material P. This sequence is due to the fact that a part of the margin in the image on photographic film F is not exposed onto the photosensitive material and the loss of light amount caused by the edge of the opening 222 of the feeder 21 is prevented. Furthermore, as seen above, the reason that the start sensor SS is moved to the position apart from the slit 15 by a predetermined distance is to buy time (also in consideration of the conveying speed of photosensitive material P) necessary for passing photosensitive material P over the exposure position "a" (that is, being brought into synchronization) following the edge part of the image on photographic film F (leading edge in the moving direction for scanning) is positioned on the slit 15, while the carriage 22 starts moving from the start position (fixed position).

Thereafter, the photosensitive material P is conveyed at a predetermined speed of $P_0$ by the exposure section conveying means 44; the carriage 22 is moved at the predetermined speed of $v_0$ employing the scanning/moving means 25; the photographic film F and the photosensitive material P are brought into synchronization, and the image of the photographic film F is scan-exposed onto photosensitive material P. And when the photosensitive material P passes through the exposure position "a", scanning-exposure is completed (FIG. 3(f)). At this time, namely, even after photosensitive material P has passed through the exposure position "a", the reason that the line image corresponding to the image of photographic film F is projected onto the exposure position is due to the margin and loss of light amount, as mentioned above.

Thereafter, when scanning-exposure of the image of the first frame of photographic film F is completed, the carriage 22 keeps moving in the right direction in FIG. 3 until the carriage 22 is detected by the home position sensor SH, and when positioned at the home position, it stops (FIG. 3(a)). The movement of the carriage 22 after completing scanning-exposure of the image of the first frame of photographic film F is carried out, while the scanning/moving means is controlled so that the moving speed becomes greater than the moving speed $v_0$ during scanning-exposure.

On the other hand, during movement of this carriage 22 or stopping at the home position, the feeder 21 releases pressure contact with photographic film F by the pressure contact plate 221, and further, the frame is conveyed by driving paired rollers 213 so that the second frame of photographic film F is positioned at the opening 212. And when conveying the frame, employing the feeder 21, is completed, photographic film F is subjected to pressure contact employing the pressure contact plate 211.

Such processes are repeated, that is, for every frame of photographic film F, correction values are input and scanning-exposure is carried out. In this connection, photosensitive material subjected to scanning-exposure is conveyed to the switch-back means 45 and development means 50, as mentioned above.

As mentioned above, in the present embodiment, the scanning/moving means 25 is controlled so that moving speed of the carriage 22 (photographic film F) which moves without performing scanning-exposure onto photosensitive material, is faster than the speed during performing scanning-exposure onto photosensitive material. In such a way, when scanning-exposure is carried out by moving the photographic film F, in the reciprocating movement naturally provided, the time necessary for moving the carriage 22 (photographic film F) not related to scanning-exposure can be shortened to improve the processing speed and processing performance.

Particularly, when the image on photographic film F is exposed onto a photosensitive material, it is required to change the moving speed of the carriage 22 (photographic film F), so as to correspond to a wide range of magnification. For example, at high magnification, in which the moving speed of the carriage 22 is slow, when the carriage is always moved, during the movement of photographic film which is not related to scanning-exposure (in the embodiment, during the movement from the home position to start position (forward movement) and during the movement to the home position after completing scanning-exposure onto photosensitive material P), an extended time is required and subsequently causes a decrease in processing speed. However, according to the present embodiment, such problems are solved employing the constitution mentioned above.

Further, when photographic film is illuminated by the illuminating means 10 (or light emitting means 171), a problem often results in which generated heat is retained in photographic film F which causes subsequent color fading. However, this problem is minimized because retained heat is released by increasing the moving speed when the film is moving without scanning-exposure, such as in the present embodiment.

The moving speed or the conveying speed by the conveying means is the moving speed of the conveyed member which is the photographic film or the exposing means in the present embodiment.

Further, the increase in moving speed is that when movement is initiated or stopped, moving speed is increased or decreased employing predetermined acceleration (referring to FIG. 4, the rising or falling portions of the graph). The term high moving speed in the present invention is of comparison in speed when the moving speed is at a constant rate, comparison in the highest moving speed or comparison in the average speed. In short, is accepted speed which makes it possible to move within shorter time than that in which photographic film F is moved at the moving speed during scanning-exposure.

Figure 5:
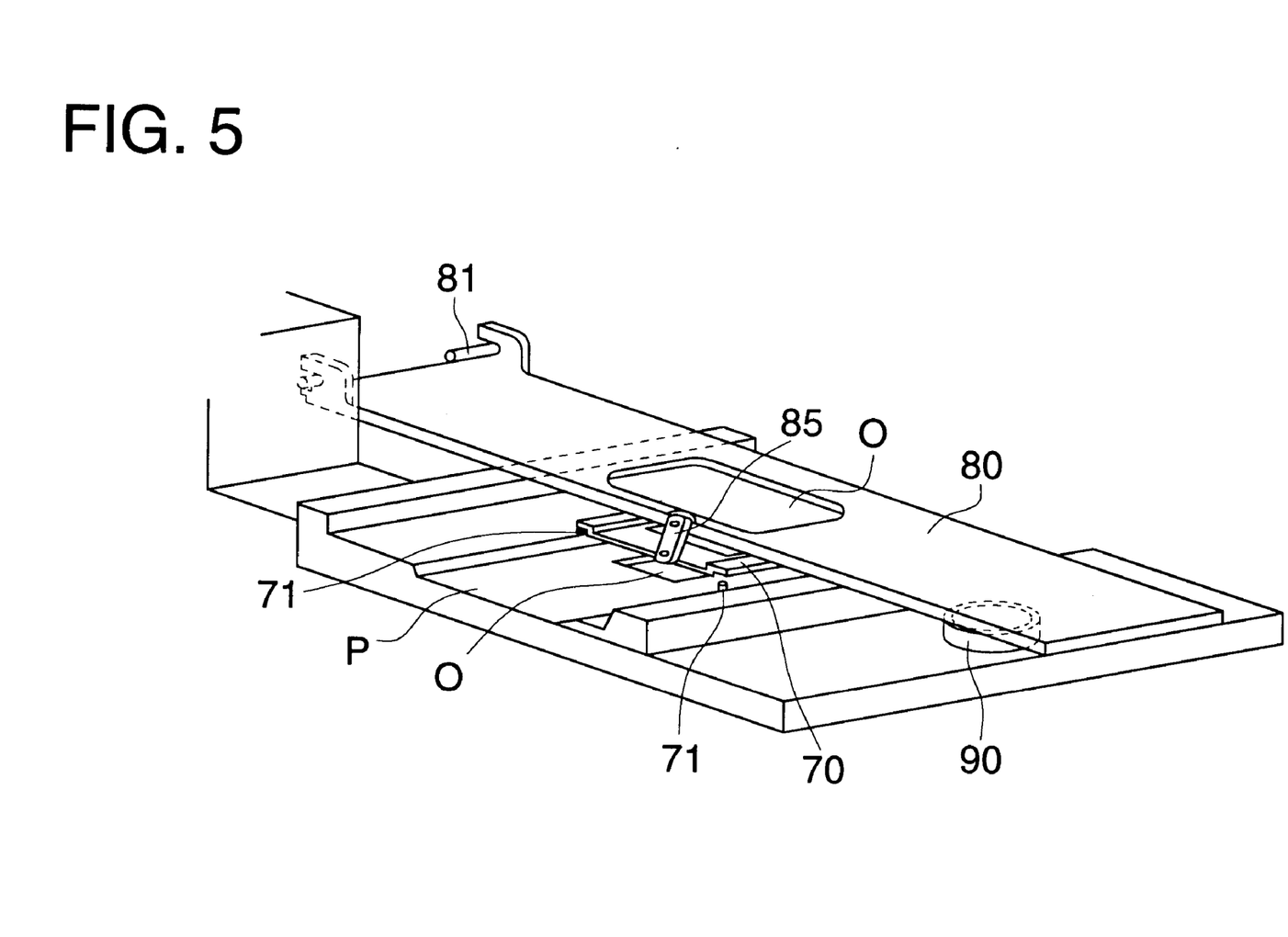
FIG. 5 is a perspective view of another example of the film holding means.

Another example of the film holding means is explained as follows. Push-up pins 71 are provided at each corner of film fixing member 70 and a coil spring is provided under each push-up pin 71 so as to push each push-up pin 71 upward. Whereby, when a solenoid 90 is not electrically energized, four corners of the film fixing member 70 are pushed up by the push-up pins 71 so that the film fixing member 70 and a pressing plate 80 locate at the film releasing position.

When the film fixing member 70 and the pressing plate 80 locate at the film releasing position, since the film fixing member 70 is not brought in contact with the photographic film located on the film passage P, the photographic film can be conveyed intermittently on the film passage P.

When the next frame is conveyed so as to locate at the opening section O through which an image on the frame can be illuminated with light, the solenoid 90 is electrically energized, thereby magnetically attracting the right side of the pressing plate 80 downward. Since the left side of the pressing plate 80 is pivotally supported by pin 81, the pressing plate 80 and the film fixing member 70 are rotated downward to the film fixing position against the spring force of the coil spring of the push-up pins.

In this embodiment, since the solenoid 90 is provided to only the right side of the pressing plate 80, the following construction is employed so as to press the four sides of the frame of the film evenly. A pair of brackets 85 are provided to the pressing plate 80 at positions corresponding to the center of the frame on both ends of the film fixing member 70. With the brackets 85, both ends of the film fixing member 70 are supported so that the film fixing member 70 can rotate between the supporting points of the brackets 85 and move slightly upward or downward.

By the above construction, the four sides of the frame of the film can be evenly pressed so that an image on the frame can be printed without any image distortion. Further, the film fixing member 70 is structured such that the image surface of the frame is not brought in contact with any pressing member. Accordingly, damages such as scratch on the image surface can be avoided so that an image on the image surface of the frame can be printed clearly.

As discussed above, when the photographic film is conveyed on the film passage P, the film fixing member 70 and the pressing plate 80 are pushed up to the film releasing position by the push-up pins 71 so that the film fixing member 70 is not brought in contact with the photographic film. In addition, a pair of rollers made of rubber and resin are employed in order to convey the photographic film. During the conveyance, the pair of rollers are rotated while coming in contact only with perforation of the film. As a result, any damage on the image surface of the photographic film can be avoided.

In the intermittent conveyance, in order to reduce the time for the printing operation, the photographic film is conveyed at a high speed so as to reduce the time for conveying the film, except the operation for reading an image or for exposing an image.

In the embodiment that the photographic film is conveyed at the high speed, by the film fixing mechanism of the present invention in which the film fixing member is supported rotatably by the pair of brackets 85, since deformation of the film such as curl, wave, or wrinkles can be avoided, the time for reaching from the low speed conveyance to the high speed conveyance or the time from the high speed conveyance to the stop can be minimized.

As a result, the film fixing mechanism of the present invention has an advantage that the film printing can be conducted with the high speed conveyance.

Incidentally, the scanning exposure can be conducted by conveying the photographic film without using the film fixing mechanism of the present invention. However, by the film fixing mechanism of the present invention, since the vibration of the photographic film due to the high speed conveyance can be avoided, the deterioration in image quality can be minimized.

In the above embodiment, the scanning exposure for the image on the film is conducted while conveying the photographic film. However, the scanning exposure for the image on the film can be conducted on the condition that the photographic film is made stationary and the optical system is moved in synchronization with a moving slit so as to form an image on photographic paper.

In this case, since the vibration of the photographic film may be reduced in comparison with the case that the photographic film is conveyed, the image may be reproduced with high quality on the photographic paper.

As detailed above, the present invention can minimize a decrease in processing speed and improve processing performance.

What is claimed is:

1. An exposing apparatus comprising:
   conveying means for conveying a photographic film reciprocatingly during a first stroke and a second stroke opposite to the first stroke;
   scanning means for scanning an image on the photographic film with light during one of the first stroke and the second stroke, and for forming at least one of light reflected from the photographic film and light transmitted through the photographic film into line-shaped image light; and
   exposing means for exposing a light sensitive material to the line-shaped image light while conveying the light sensitive material relative to the line-shaped image light;
   wherein the conveying means comprises means for conveying the photographic film at a first conveying speed when the light sensitive material is not exposed to the line-shaped image light, and means for conveying the photographic film at a second conveying speed when the light sensitive material is exposed to the line-shaped image light, said first conveying speed being faster than the second conveying speed.

2. The exposing apparatus of claim 1, further comprising a plate on which a slit to reduce a width of light irradiated by the exposing means is provided on an optical path between the photographic film and the light sensitive material.

3. The exposing apparatus of claim 1, further comprising:
   light measuring means for measuring at least one of the light reflected from the photographic film and the light transmitted through the photographic film during the first stroke, and for outputting a light measurement value; and
   exposing control means for controlling a light amount projected onto the light sensitive material during the second stroke based on the light measurement value.

4. The exposing apparatus of claim 1, further comprising film holding means for holding the photographic film.

5. The exposing apparatus of claim 4, wherein the film holding means comprises means for maintaining a flatness of at least a region on the photographic film irradiated with light by the exposing means.

6. The exposing apparatus of claim 4, wherein the film holding means comprises a film pressing member for applying a pressing force in a direction perpendicular to a surface of the photographic film on at least two points arranged in a direction perpendicular to a longitudinal direction of the photographic film, and the film pressing member has a fulcrum point located near a center of a width of the photographic film.

7. The exposing apparatus of claim 4, wherein the film holding means comprises a film pressing member having a fulcrum point located near a center of a width of the photographic film, and the film pressing member rocks around the fulcrum point in a direction perpendicular to a surface of the photographic film.

8. The exposing apparatus of claim 1, wherein the photographic film is reciprocated between a home position at which the image on the photographic film is checked and a start position from which the scanning the scanning means begins scanning.

9. The exposing apparatus of claim 8, wherein a time for conveying the photographic film without exposing the light sensitive material is a time for conveying the photographic film to the home position after exposing the light sensitive material and a time for conveying the photographic film from the home position to the start position.

* * * * *